Feb. 7, 1967   J. L. LEDEEN   3,302,573
APPARATUS FOR PUMPING LIQUID METALS
Filed June 5, 1964   10 Sheets-Sheet 1

INVENTOR.
J. L. LEDEEN
BY
Cyrus D. Samuelson
ATTORNEY

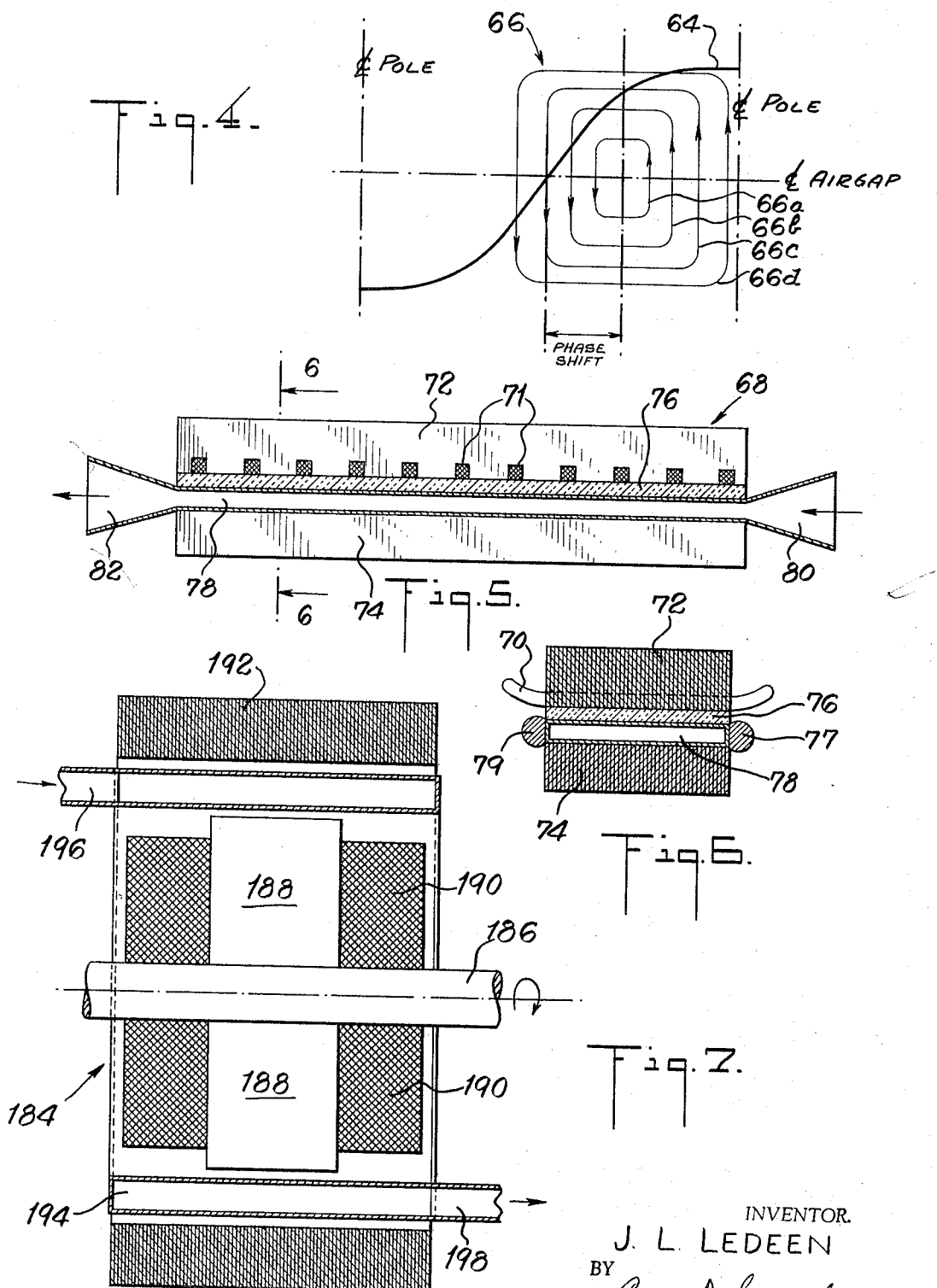

Feb. 7, 1967     J. L. LEDEEN     3,302,573
APPARATUS FOR PUMPING LIQUID METALS
Filed June 5, 1964     10 Sheets-Sheet 3

INVENTOR.
J. L. LEDEEN
BY
Cyrus D. Samuelson
ATTORNEY

Feb. 7, 1967  J. L. LEDEEN  3,302,573
APPARATUS FOR PUMPING LIQUID METALS
Filed June 5, 1964  10 Sheets-Sheet 4

INVENTOR.
J. L. LEDEEN
BY
Cyrus D. Samuelson
ATTORNEY

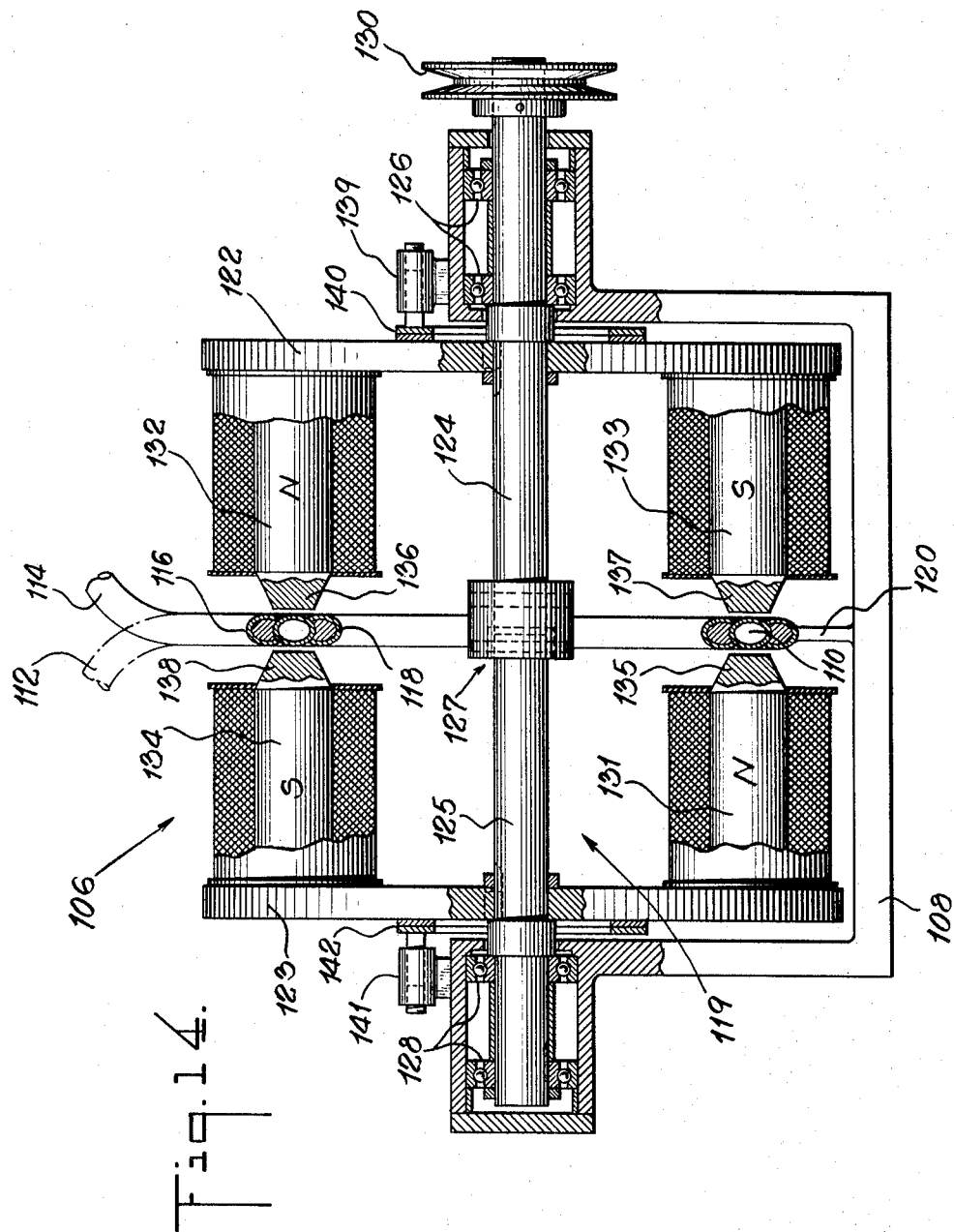

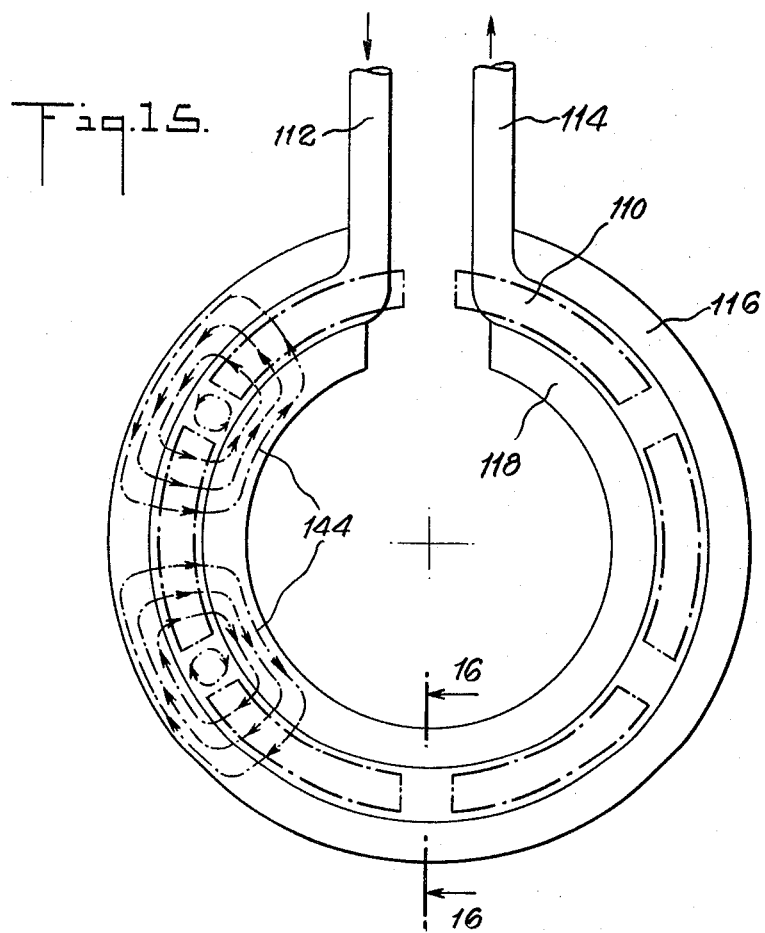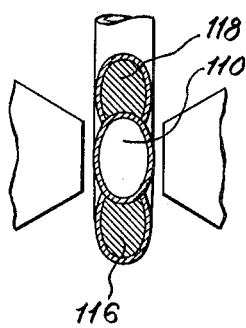

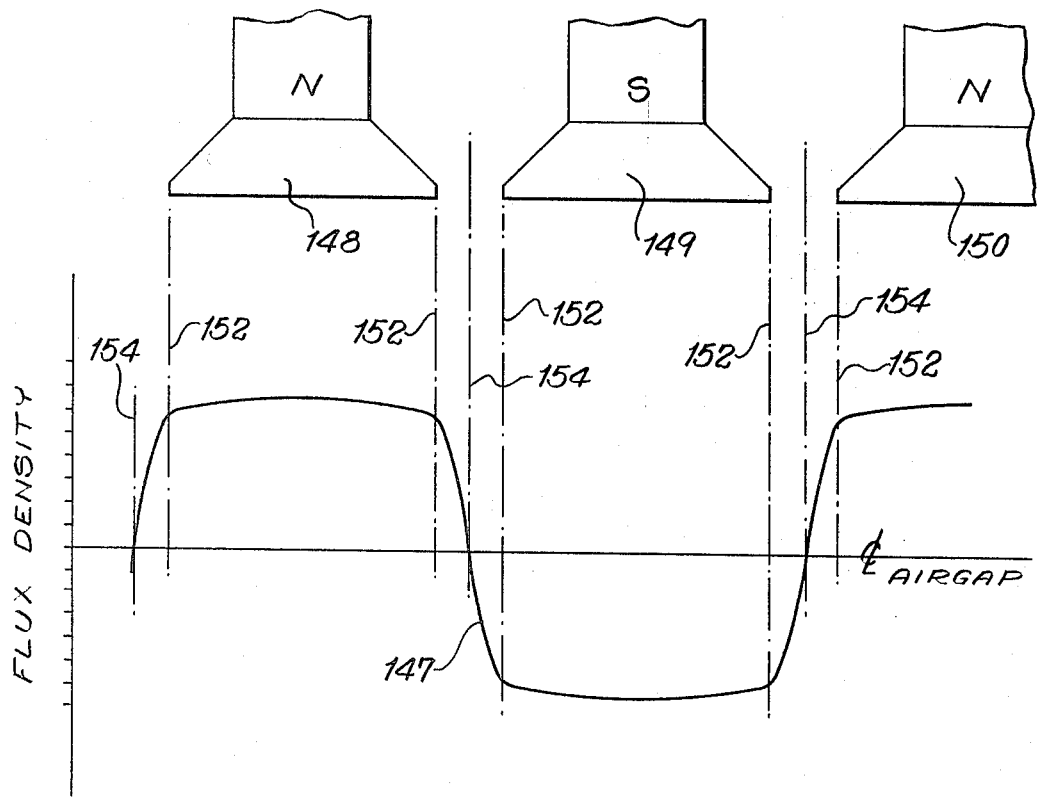

Feb. 7, 1967 J. L. LEDEEN 3,302,573
APPARATUS FOR PUMPING LIQUID METALS
Filed June 5, 1964 10 Sheets-Sheet 9
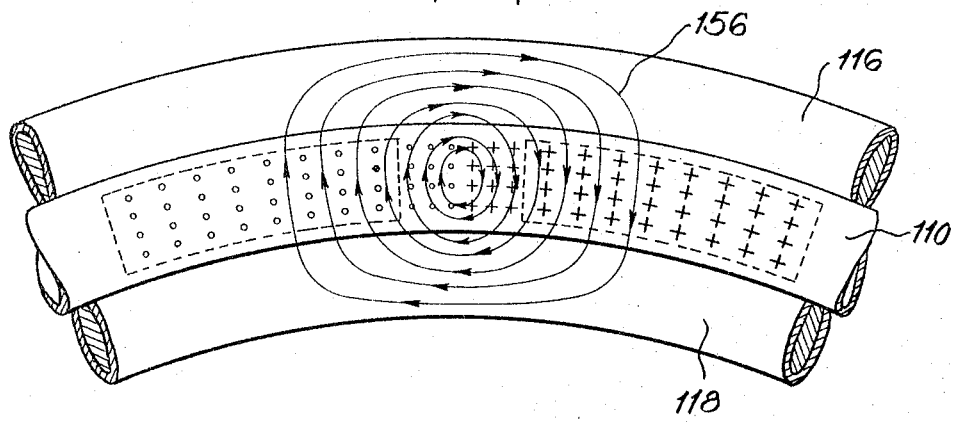
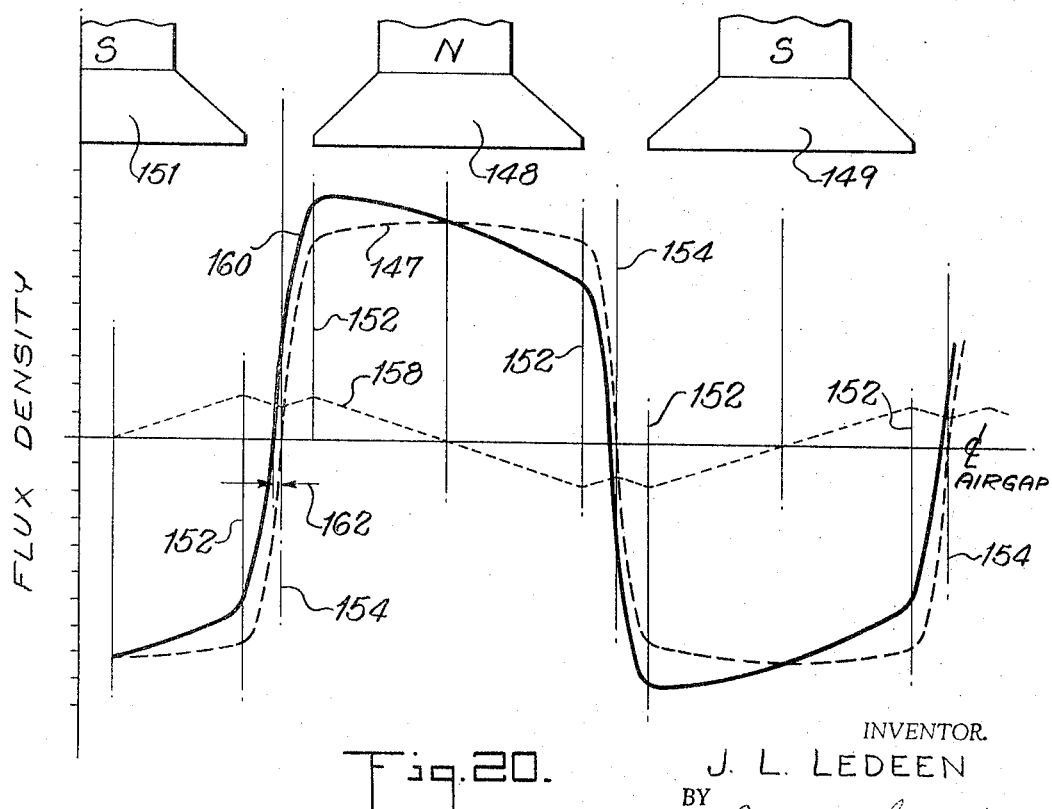
INVENTOR.
J. L. LEDEEN
BY
Cyrus D. Samuelson
ATTORNEY Feb. 7, 1967 J. L. LEDEEN 3,302,573
APPARATUS FOR PUMPING LIQUID METALS
Filed June 5, 1964 10 Sheets-Sheet 10

INVENTOR.
J. L. LEDEEN
BY
Cyrus D. Samuelson
ATTORNEY

United States Patent Office 3,302,573
Patented Feb. 7, 1967

3,302,573
APPARATUS FOR PUMPING LIQUID METALS
Julian Louis Ledeen, 32 Park Road,
Maplewood, N.J. 07040
Filed June 5, 1964, Ser. No. 372,819
21 Claims. (Cl. 103—1)

The invention relates to apparatus for pumping liquid metals and more particularly to electrodynamic pumps for this purpose.

In the prior art, there have been various types of electromagnetic pumps with moving fields which have been used to pump liquid metals and which possess disadvantages which the pump of the instant invention seeks to overcome. These prior art electromagnetic pumps are: helical polyphase induction pump; linear polyphase induction pump; Einstein-Szilard pump; radial magnet rotor pump; electromagnetic centrifugal pump; and electrodynamic pump.

In the helical polyphase induction pump, the effect of a rotating magnetic field is achieved by using a three-phase stator winding similar to that used in an induction motor and circular laminated iron assemblies to carry the field flux. The rotating magnetic field is essentially sinusoidal. The high inductance of this design results in phase displacement between the magnetic field and the induced eddy currents in the liquid metal being pumped, causing some of these currents to exert negative pumping effects which greatly reduce pumping efficiency. Furthermore, since the speed of rotation depends on the number of magnet poles and on the electrical frequency of the power supply, for any given arrangement of winding and existing frequency of power supply, only one linear speed of field rotation is possible for a given size pump. This seriously limits the flexibility of the helical induction pump.

The linear polyphase induction pump is very similar to the helical induction pump. The circular stator winding of the helical induction pump and the fluid conduit and their associated laminated iron cores have been unfolded into a straight-line arrangement. The linear induction pump possesses the same inherent disadvantages as the helical induction pump.

The Einstein-Szilard pump is essentially a linear polyphase induction pump rolled up into a tube along its long axis. It possesses the same disadvantages as to the other polyphase induction pumps along with some mechanical shortcomings.

The electromagnetic centrifugal pump is a polyphase induction pump with a centrifugal volute casing in which the liquid metal is accelerated circumferentially and radially by a rotating magnetic field created by a stationary polyphase stator winding or by a mechanically rotated, D.-C. energized field, associated with a stationary, laminated iron return flux path. This pump suffers from the increased hydraulic losses characteristic of centrifugal pumps in addition to the previously mentioned disadvantages of the induction pumps.

The radial magnet pump is one in which the magnetic field is rotated mechanically, the magnets being arranged as salient poles on a central hub, somewhat similar to the rotor of a synchronous motor. The return magnetic circuit is in the form of a stationary laminated iron structure surrounding the rotor. The fluid conduit is an annular passage located in the air gap. In one version, called a helical rotor pump, the salient poles are skewed to create interpole spaces which travel helically around the shaft rather than parallel to it, but the basic principle is the same. These pumps also incur reverse pumping effects, are lacking in pumping efficiency, and present a cooling problem for the salient pole windings.

The electrodynamic pump is exemplified by the pump described in United States Patent 2,915,973, issued December 8, 1959, to Jacqueline M. Findlay. This electrodynamic pump to a large extent eliminates the reverse pumping effects inherent in the various induction pumps described above. This is achieved by substituting for the polyphase field a mechanically rotated magnetic field without employing any stationary return path. This is accomplished by rotating an assembly of magnet pairs which are either permanent magnets or electromagnets. These magnet pairs are spaced around the arc of the fluid conduit with sufficient intervening distance between adjacent pairs to make some regions of the fluid conduit flux-free.

The stationary laminated iron cores of the helical and linear polyphase pumps, the electromagnetic centrifugal pump, and the radial magnet pump are eliminated. Inductance of the eddy current circuit is low, phase displacement of the eddy currents is largely avoided, and negative pumping effects are thereby largely nullified. In addition, the rotational speed of the magnetic field is easily changed by varying pulley sizes in, for example, a V-belt drive from a constant speed motor. This results in considerable flexibility at relatively little cost. Despite the many advantages of this electrodynamic pump over the other types of pumps used for pumping liquid metals, it still leaves much to be desired in overall performance.

The electrodynamic pump of the prior art is characterized by a wide spacing between the adjacent magnet poles in order to produce substantially flux-free areas within the liquid conduit to minimize the regions of negative pumping. The result of this wide spacing is to produce regions of zero pumping. Obviously, while zero pumping is an improvement over negative pumping, a greater improvement will result if the regions of zero pumping are eliminated and all regions contribute positive pumping.

The apparatus of the present invention, which also employs a mechanically rotated magnetic field, achieves further substantial improvement in performance of liquid metal pumps by eliminating these regions of zero magnetic flux in the liquid metal conduit through the employment of an even number of pairs of magnetic poles arranged so that adjacent poles on each side of the liquid conduit are of opposite polarity and shaped and spaced so as to create a continuous flux field. Accordingly, it is an important object of the invention to provide an electrodynamic pump wherein regions of zero magnetic flux in the liquid conduit are eliminated.

It is a further object of the invention to provide such an electrodynamic pump wherein, in the arc of the fluid conduit, the reversal of direction of magnetic flux takes place within a distance from the edge of any pole piece or shaped pole of twice the width of the main air gap.

It is a still further object of the invention to provide such an electrodynamic pump wherein the magnet poles are each provided with pole pieces which are flared outwardly from the magnet poles toward the liquid conduit and toward the similar edges of the adjacent pole pieces on the same side of the conduit.

It is a still further object of the invention to provide such an electrodynamic pump wherein the magnet poles are flared outwardly toward the liquid conduit and toward the similar flared edges of the adjacent magnet poles on the same side of the liquid conduit.

It is a still further object of the invention to provide such an electrodynamic pump wherein the spacing between the adjacent magnet pole faces on the same side of the liquid conduit is much less than can be achieved by the prior art pumps.

It is a still further object of the invention to provide a rotating primary magnetic field which consists of a series of substantially square wave pulses of magnetic flux, alternating in direction and wherein the change in direction is rapid.

It is a still further object of the invention to provide such as electrodynamic pump for use in rarefied atmospheres.

These and other objects, advantages, features and uses will be apparent during the course of the following description, when taken in conjunction with the accompanying drawings, wherein:

FIGURE 4 is a plot of the actual eddy currents with respect to the flux and induced voltage waves in the pump of FIGURE 1 showing the phase shift resulting from the fact that the eddy current circuits are not non-inductive;

FIGURE 5 is a simplified illustration, partly in section, of a linear polyphase induction pump of the prior art;

FIGURE 6 is a sectional view taken along the lines 6—6 of FIGURE 5, viewed in the direction of the arrows;

FIGURE 7 is a simplified illustration, partly in section, of a radial magnet rotor pump of the prior art;

FIGURE 8 is a plot of the average flux pattern in the liquid conduit obtained from the prior art electrodynamic pump in which the magnet poles on one side of the liquid conduit successively reverse polarity and which is characterized by its flux-free regions;

FIGURE 9 is a plot similar to that of FIGURE 8 with the eddy currents shown superimposed thereon and showing the reduced eddy current phase shift;

FIGURE 10 is a plot similar to that of FIGURE 9 for an electrodynamic pump in which the magnet poles on one side of the liquid conduit are all of the same polarity;

FIGURE 14 is a front elevational view, partly in section, of a preferred embodiment of the electrodynamic pump of the invention;

FIGURE 15 is a partly diagrammatic side elevational view of the liquid metal conduit of the electrodynamic pump of FIGURE 14, showing the formation of the eddy currents;

FIGURE 16 is an enlarged, sectional view taken along the lines 16—16 of FIGURE 15, viewed in the direction of the arrows;

FIGURE 18 is a plot showing the spatial distribution of primary magnetic flux density in an electrodynamic pump of FIGURE 14, wherein the counter-magnetizing effects of the eddy currents are not shown;

FIGURE 19 is an enlarged view of a portion of the liquid metal conduit and the associated electrical conductors and the magnet poles showing the eddy current directions and the magnetic flux directions wherein the counter-magnetizing effects of the eddy currents have been neglected;

FIGURE 20 is a plot similar to that of FIGURE 18 showing the resultant flux density and the small shift of the zero flux plane due to the counter-magnetizing effects of the eddy currents.

In the drawings there are illustrated many of the prior art pumps and preferred embodiments of the pump of the invention. Throughout the drawings, like numerals and designations are used to refer to like parts and elements therein.

Figure 1:
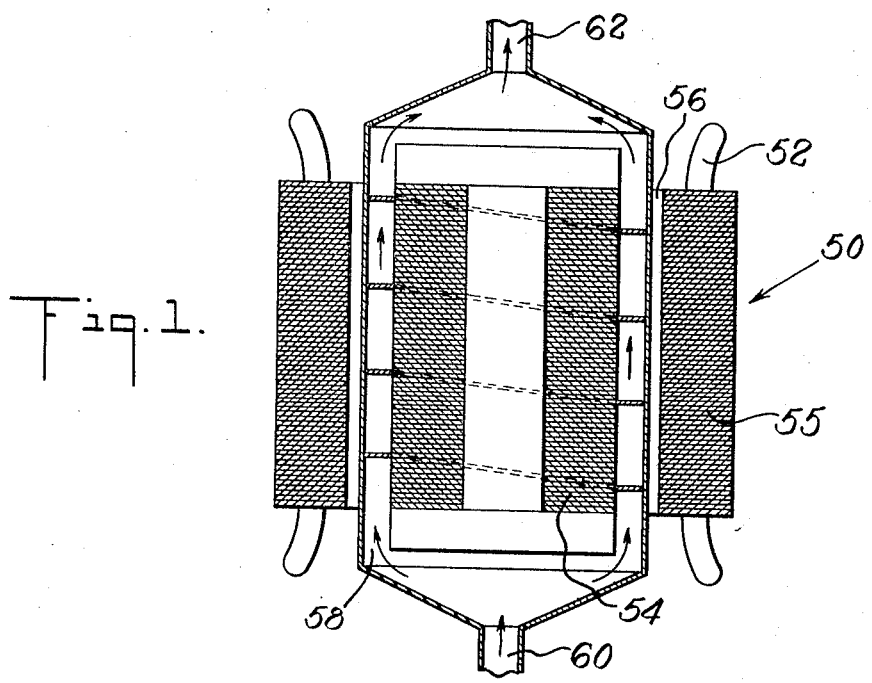
FIGURE 1 is a simplified drawing, partly in section, of a helical polyphase induction pump of the prior art.

In order to fully understand the improved features and advantages of the electrodynamic pump of the instant invention, it is necessary to discuss the various prior art pumps which have been referred to earlier in this specification. In FIGURE 1 there is illustrated, in simplified form, a helical polyphase induction pump of the prior art. Helical polyphase induction pump 50 is seen to comprise a three-phase stator winding 52, a rotor core 54 which is actually stationary, a stator core 55, thermal insulator 56, and fluid conduit 58. Fluid conduit 58 is provided with entrance position 60 and exit position 62. The fluid enters the conduit through entrance position 60 and is emitted from the conduit through exit position 62.

Pumps of this type are similar in construction and performance to those of an inefficient induction motor of the squirrel cage type. A rotating magnetic field is produced by the conventional three-phase stator winding 52 which is mounted in the slots of the stack of iron laminations of stator core 55. Core 54 is formed of a stack of laminations similar to those of core 55 and provides a stationary core for the rotor." There is no winding provided within stationary core 54. The electrically conductive fluid passes through the helical annulus passage of conduit 58 which is located in the air gap between cores 54 and 55 and constitutes the moving "rotor" of the pump.

Figure 2:
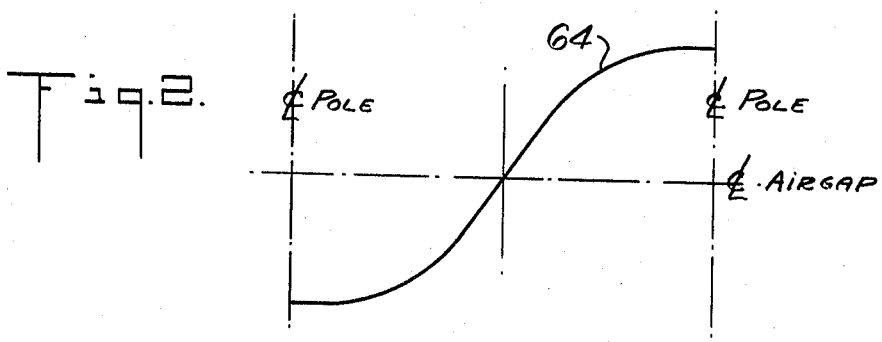
FIGURE 2 is a plot of the spatial distribution in the rotating magnetic field of the pump of FIGURE 1.

The rotating magnetic field intercepting the fluid sets up eddy currents in the fluid which interact with the magnetic field to cause an axial thrust on the fluid in accordance with the following, well-known equation:

$$F = k\beta l i \quad \text{(Equation 1)}$$

where
$F$ = force
$k$ = a constant
$\beta$ = flux density
$l$ = axial length of fluid in magnetic field
$i$ = eddy current strength The eddy current is the result of a voltage generated in the fluid according to the equation:

$$V = c\beta l s \quad \text{(Equation 2)}$$

where
$V$ = voltage
$c$ = a constant
$\beta$ = flux density
$l$ = axial length of fluid in magnetic field
$s$ = relative speed of magnetic field with respect to moving fluid With a properly designed stator winding, the rotating magnetic field is essentially sinusoidal in spatial distribution as shown in FIGURE 2. The voltage generated in the fluid is in phase with the flux wave 64 illustrated in FIGURE 2. Viewed from a fixed point in space, the voltage is seen to be an alternating voltage which has the same frequency as the flux wave. Viewed from a point moving with the fluid, the alternating voltage is seen to have a reduced frequency. This frequency is generally designated as the slip frequency and is related to the difference between the speed of the flux wave and the speed of the fluid.

Figure 3:
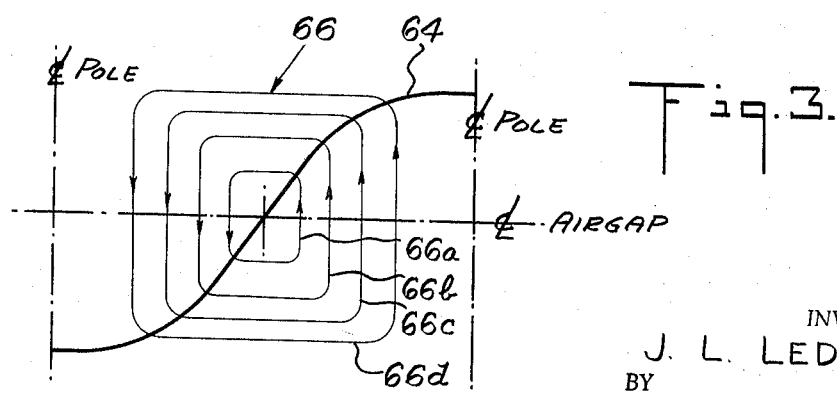
FIGURE 3 is a plot showing the eddy current loops generated by the pump of FIGURE 1 superimposed on the spatial flux distribution of FIGURE 2 assuming the eddy currents are flowing in a non-inductive circuit.

The alternating voltage creates alternating eddy currents in the fluid in the form of a series of closed loops, the number of such loops being equal to the number of magnetic poles. If these eddy currents, which have been designated as 66 and whose filaments have been separately designated as 66a, 66b, 66c and 66d, were flowing in a non-inductive circuit, the pattern of the eddy current loop would appear as illustrated in FIGURE 3. For simplification, the illustration of FIGURE 3 does not take into account the effect of the "counter-magnetization" caused by the eddy currents. It is seen that in the right side of FIGURE 3 the upward moving filaments of current 66a, 66b, 66c, and 66d all interact with the positive areas of flux; on the left side of FIGURE 3 the downward moving filaments of current all interact with negative areas of flux. Since the directions of the current filaments are reversed and the direction of the flux wave is reversed, the pumping effects due to the interaction of the flux wave and the eddy current flow are additive.

However, the eddy current circuits are not non-inductive because of the proximity of the stationary iron core and because the air gap is comparatively large. The reactance caused by these inductive effects is enlarged due to the high slip speeds between the magnetic field and the fluid which is characteristic of helical polyphase induction pumps. This slip speed is usually 50% or more of the synchronous speed. As a result the eddy currents lag behind the voltages which produce them. This lag may be illustrated by shifting the eddy current pattern in a direction opposite to the flow of the fluid. This condition is designated as the "phase shift" and is illustrated in FIGURE 4.

It is to be noted in FIGURE 4 that now current filament 66a passes upward and downward in a region of positive flux. The downward branch of current filament 66a results in a negative pumping effect, the upward branch of the current filament 66a produces an increased positive pumping effect because it has shifted to a region of higher flux density. But because of the sinusoidal curvature of the flux wave, the increase of pumping effect over the condition shown in FIGURE 3 is not sufficient to compensate for the decrease due to the downward branch of current filament 66a. Consequently, as a result of the eddy current shift there is a net loss of pumping effect. Similarly, the upward branch of current filament 66c produces an increased positive pumping effect over that illustrated in FIGURE 3 but the downward branch of this current filament produces zero pumping effect so that there is a net loss in pumping effect. It can be seen from an examination of FIGURE 4 that all the current filaments in the eddy current pattern produce less pumping effect than do the eddy current filaments of FIGURE 3. The inescapable conclusion, which is compatible with the known behavior of induction motors, is that the high reactance effects of the eddy currents reduce the performance of the pump considerably. As the reactance increases the pumping capacity declines. The high reactance effects also tend to reduce the power factor of the pump. Tests have shown that these pumps have a power factor which is considerably worse than induction motors thereby confirming the existence of high reactance.

Pump efficiency is reduced because these pumping effects are being reduced with no reduction in current and consequently no reduction in heat loss. Since these pumps are also subject to accentuated magnetic core losses because of the high slip speeds, the helical polyphase induction pumps are rather inefficient.

In FIGURES 5 and 6 there is shown a simplified illustration of a linear polyphase induction pump of the prior art. Linear polyphase induction pumps are the equivalent of helical polyphase induction pumps with the circular stator winding, the iron cores, and the fluid conduit unfolded into a straight-line arrangement. The magnetic field travels linearly instead of rotating as it does in the helical polyphase induction pump. Pump 68 is seen to comprise stator winding 70 which is wound in slots 71 in laminated stator core 72, laminated rotor core 74, thermal insulation 76, and fluid conduit 78 which is provided with entrance position 80 and exit position 82. An additional feature of this type pump is found in the electrical conductor bars 77 and 79 which run the length of fluid conduit 78 and are in close electrical contact therewith. These electrical conductor bars correspond to the short-circuiting rings on the rotors of the common squirrel cage induction motors. They reduce the resistance of the eddy current path but since they are close to the core they increase the inductance and there is a partial cancelling effect on the pump performance.

The more detailed description given above for the mechanisms and functioning of the helical polyphase induction pump apply equally well to the linear polyphase induction pumps and the same conclusions with respect to them may be reached.

Both of these polyphase induction type pumps which have been described just above possess certain additional disadvantages. When the temperatures of the pumped fluids approach 1000° F. there is difficulty in preventing the deterioration of the insulation on the stator windings. As a consequence, forced external cooling is required in all cases. Furthermore, the state of the art now requires the pumping of liquid metals at even higher temperatures which are of the order of 1500° F. to 2000° F. and above. The cooling problem in pumps of of the polyphase induction types becomes extremely difficult to solve when they are used to pump high temperature liquid metals especially since the iron loses its magnetic properties in the neighborhood of about 1400° F. (Curie point).

In FIGURE 7 there is shown a simplified illustration of a radial magnet rotor pump of the prior art. Pump 184 is seen to comprise shaft 186 on which are mounted magnet poles 188 which are energized by coils 190, iron core 192 which serves as the return magnetic path, and fluid conduit 194 which is provided with an entrance position 196 and an exit position 198. This type pump, in one version, is called a helical rotor pump since the poles are skewed with reference to the shaft axis. Generally the alternate poles are of reversed polarity. This pump is rather inefficient, and a modification in which all poles on the rotor are of the same polarity is not as good because of the negative pumping effects occurring in the areas between the poles, which are not flux free.

The electromagnetic centrifugal pumps of the prior art comprise a centrifugal volute casing without a rotor. A rotating magnetic field, either polyphase or direct current, associated with a stationary, laminated iron core, whirls the fluid through a path identical to that which a rotor would force it to take. This type pump suffers from the high hydraulic losses which are common in the usual types of centrifugal pumps, in addition to the other disadvantages of induction pumps with stationary iron cores in the flux return path.

The prior art electrodynamic pumps are exemplified by that described in the Findlay Patent 2,915,973. In order to eliminate the reversed pumping effects described above when considering the polyphase induction pumps, the sinusoidal flux distribution around the air gap was eliminated and a flux pattern with regular discontinuities was substituted therefor. In essence, the flux pattern of the magnet pairs is a series of trapezoidal wave pulses such as are illustrated in FIGURE 8. The trapezoidal curves in FIGURES 8, 9 and 10 are plots of the variation of average magnetic flux density in the air gap along the center line of the air gap, for a distance embracing two magnet pole pairs, and for the arrangement where successive adjacent poles have opposite polarity. The positive flux pattern has been designated by the numeral 86 and the negative flux pattern by the numeral 88. The midplane is the plane midway between adjacent magnet poles, the center line of the air gap is the line midway between the faces of the magnets in a magnet pair and passing through the pole center lines, and the center line of the pole is the axis of the pole. In order to obtain the flux pattern illustrated in FIGURE 8 pairs of magnets of either the permanently magnetized or D.-C. energized types are assembled, spaced around the arc of the fluid conduit so that there are regions of the fluid conduit between adjacent magnet pairs which are substantially flux-free. This assembly is constructed so it can be rotated mechanically.

This arrangement has an inherent advantage over the polyphase induction pumps in that the extensive laminated magnetic core is eliminated and the pulsating eddy currents flow in comparatively non-inductive circuits. As a consequence, the destructive phase shift between the flux-voltage waves and the induced eddy currents is virtually eliminated as shown in FIGURE 9. This eddy current pattern 90 virtually eliminates any significant negative pumping effects.

Low resistance electrical conductors are bonded to the fluid conduit on opposite sides thereof to facilitate passage of the lateral branches of the longer eddy current filaments in a manner similar to that illustrated for the linear polyphase induction pump.

An examination of FIGURE 9 will show that the combination of the eddy current filament 90d with flux patterns 86 and 88, the eddy current filaments 90a, 90b and 90c with flux pattern 88 and the eddy current filaments 90e, 90f and 90g with flux pattern 86 are such that the pumping is always in the same direction and there are no reverse pumping effects. However, it is to be noted that there are considerable regions in which there are zero pumping effects.

Up to now, it has been assumed that the electrodynamic pump has been constructed with the adjacent poles of opposite polarity. This pump can also be constructed so that instead of alternately reversing the pole polarities along the fluid conduit all pole pairs provide flux fields in the same direction. All flux pulses would then be positive and the eddy current pattern and the flux pattern would appear as is illustrated in FIGURE 10. It is to be noted that in this arrangement the eddy current filaments 92 do not interlace with flux area 86 and the eddy current filaments 94 do not inerlace with flux area 85. There is no interlacing similar to that shown for eddy current filament 90d in FIGURE 9.

It can be seen that if the electrical conductor bars are properly proportioned, the arrangement of FIGURE 9 is more efficient than that of FIGURE 10 because a filament such as 90d in FIGURE 9 is subjected to double the generated voltage of a filament such as 90c but traverses a path of less than double the resistance. Consequently, the current flow is greater thereby producing greater pumping effect. It should be noted that filament 90d in FIGURE 9 does not have a return path through the flux-free region.

Figure 11:
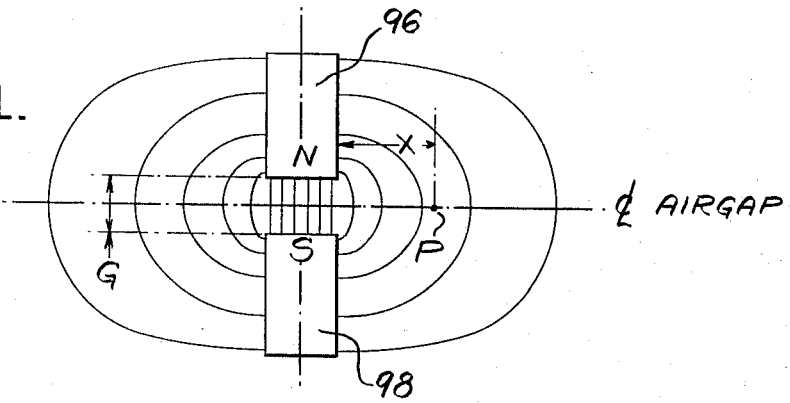
FIGURE 11 is a plot of the magnetic flux field between two cylindrical, magnet poles of opposite polarity.

It is quite difficult to obtain flux-free regions between adjacent magnet pole pairs because of the fringe flux which always surrounds magnet poles. FIGURE 11 illustrates the flux distribution surrounding a pair of cylindrical permanent magnets 96 and 98. The flux density at point P on the air gap center line is approximately 25% of the average density in the main air gap when X, the distance from P to the magnet edge is equal to G, the air gap between the two magnet poles. The flux density at point P is 10% of the average flux density in the main air gap when X equals 2G.

Figure 12:
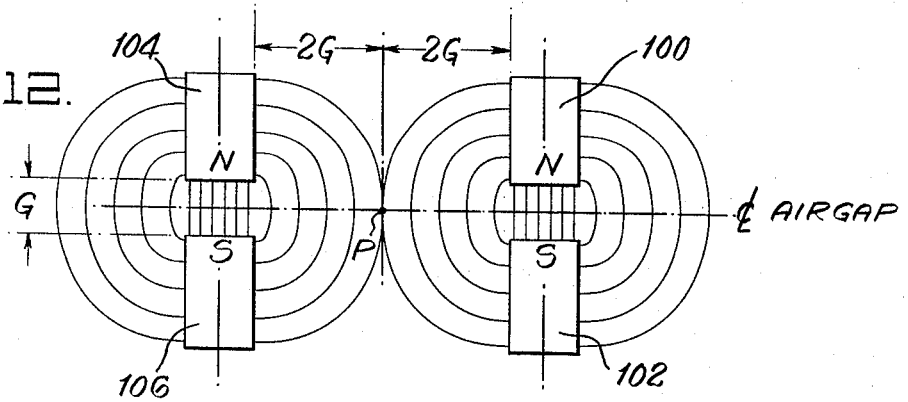
FIGURE 12 is a plot of the magnetic flux field between two pairs of cylindrical, magnet poles wherein the like poles are adjacent to each other.
Figure 13:
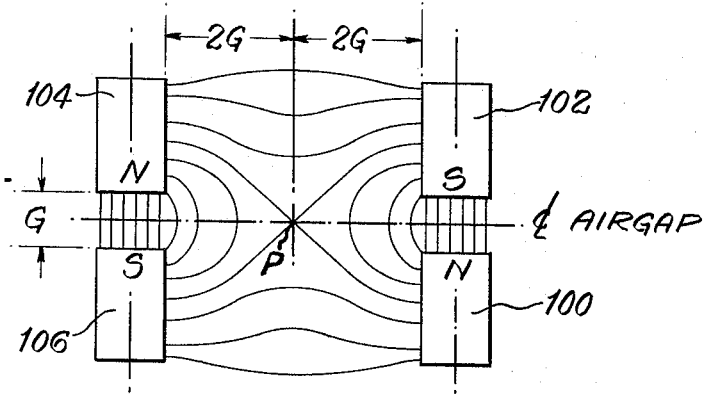
FIGURE 13 is a plot of the magnetic flux field between two pairs of cylindrical, magnet poles wherein the like poles are not adjacent to each other.

In FIGURE 12 there is illustrated the flux pattern resulting from 2 sets of magnet pole pairs in which the poles of like polarity are adjacent to each other. The magnet pole pairs in FIGURE 12 have been designated as 100 and 102 and 104 and 106. For illustrative purposes, magnet pole 100 is spaced a distance of 4G from magnet pole 104 and magnet pole 102 is spaced a similar distance from magnet pole 106. The flux density at point P, a distance of 2G from both magnet pairs and located along the center line of the air gap, is more than 10% of the average main air gap flux density because the lines of flux from the adjacent poles reinforce each other. If the positions of magnet poles 100 and 102 are reversed from their positions in FIGURE 12 as shown in FIGURE 13, it is seen that the flux density at point P is zero. However, zero flux density can only be obtained at this *point* and there would be no *region* of zero flux. Immediately to either side of point P the flux density would tend to decrease.

There are no regions of significant extent along the center line of the air gap that are substantially flux-free for the arrangements of FIGURE 12 or FIGURE 13. It therefore must be concluded that the distance between magnet pole pairs has to be substantially increased to some amount greater than 4G in order to obtain substantially flux-free regions in the air gap.

Unfortunately, as this interpole distance is increased, the lengths of the eddy current paths are increased so that there is a consequent increase in the resistances of the paths. This reduces the eddy current strength and increases the slip speed. Longer eddy current paths also result in increased leakage reactance in the eddy current circuits thereby increasing the phase shift previously discussed and initiating negative pumping effects. All of these factors result in reduced pump performance. Consequently, it can be seen that a pump construction which will improve pump efficiency is required.

The best way to improve the efficiency of electrodynamic pumps is to increase their pumping performance by eliminating the regions of zero pumping effect. This can be done by arranging the pump construction so that all regions of the fluid conduit can contribute to positive pumping effects. The eddy current paths are kept as short as possible to minimize their resistance and to decrease slip speed. Leakage reactance is also minimized with a consequent minimization of the phase shift and a maximization of pump efficiency.

Shaped pole pieces made of mild steel or other material of high magnetic permeability are used to keep the flux leakage between adjacent magnet poles within acceptable limits in order to accomplish the objective set forth above. These shaped pole pieces are constructed so that they taper outward from each pole to thin edges which approach the edges of the adjacent pole pieces as closely as feasible to achieve a predetermined flux density in the main air gap, with relatively sharp reversal of flux direction between adjacent pole pairs, while suppressing lateral leakage. The same effect can of course be achieved by shaping the ends of the magnet poles themselves in this fashion rather than employing shaped pole pieces.

This construction conveys another important benefit, in that the faces of the poles confronting the fluid conduit are widened. This gives a maximum spread for the full flux density existing in the main air gap and creates an approximation to a square flux wave as shown in FIGURE 18. It widens the area of a critical portion of the eddy current path, further reducing its resistance, and further increasing the strength of the eddy current. With both flux density and eddy currents thus provoked to higher levels over increased areas of the fluid conduit, the total pumping effect is also increased, since it is the integral of the product of flux density and eddy current around the arc of the fluid conduit (Equation 1).

To achieve a construction of electrodynamic pump wherein there are substantially no flux-free regions and relatively sharp reversals of flux direction are achieved, the interpole spacing ofadjacent magnet pole edges should be kept between the final air gap width and 4 times the final air gap width this being defined as the width of the air gap with the pole pieces in place.

In FIGURE 14 electrodynamic pump 106 is seen to comprise frame or housing 108, arcuate, tubular, electrically conductive conduit 110 having an entrance position 112 and an exit position 114, outer electrical conductor 116 and inner electrical conductor 118 both of which are bonded to tubular conduit 110, and rotatable magnetic assembly 119. Tubular conduit 110 is supported in the frame by support 120 which is shown schematically in the drawing. Rotating magnetic assembly 119 comprises a pair of shafts 124 and 125 which are coupled by coupling 127 as shown in the figure, back mounting plate 122 which is affixed to shaft 124 and back mounting plate 123 which is affixed to shaft 125, and pairs of magnets 132–134 and 131–133 which are mounted on back plates 122 and 123 as illustrated in the figure. Shaft 124 is mounted in bearing 126 and shaft 125 is mounted in bearing 128 and the combined shafts are driven by means of pulley 130 from an electric motor not shown in the drawing. Magnetic poles 131 through 134 are shown to be electromagnets but they may also be permanent magnets. As electromagnets they are energized through brushes 139 and 141 which contact slip rings 140 and 142 to supply current to the electromagnet coils. Pole pieces 135, 136, 137 and 138 are respectively affixed to magnet poles 131, 132, 133 and 134. While the particular embodiment illustrated and described in this specification shows pole pieces affixed to the magnet poles and formed separately from the magnet poles, it is within the contemplation of the invention to form the magnet pole itself with its face adjacent to the tubular conduit formed and shaped as illustrated and described herein. In order to obtain alternating polarity of the adjacent magnet poles, the invention teaches the need for an even number of magnet pole pairs to practice the invention.

In FIGURE 15 there is shown an enlarged, simplified illustration of the tubular conduit 110 of the invention to which has been suitably affixed electrical conductors 116 and 118 so as to make good electrical contact with the tubular conduit. Preferably, the tubular conduit 110 is formed of some noncorrosive or corrosive-resistant material such as stainless steel, or refractory metal such as columbium or tantalum, and the electrical conductors 116 and 118 are formed of a good electrically conductive material such as silver. Tubular conduit 110 may also be formed entirely of nonconductive material such as ceramic, or it may be formed of a combination of materials such as ceramic and suitable metal. If it is formed entirely of nonconductive material, the electrical conductors 116 and 118 are omitted. If it is formed as a ceramic-metal composite, the metal surfaces must be those in intimate contact with the electrical conductors 116 and 118, and the ceramic surfaces form all or a part of the remainder of the conduit. The eddy current groups 144 show the eddy current paths through the electrical conductor rings 116 and 118. These eddy current groups are formed as a result of the rotation of the magnet assembly in the same manner as has been described heretofore in connection with the prior art electrodynamic pumps and the polyphase induction pumps. If electrical conductor rings are omitted, the eddy currents will complete their paths within the tubular conduit and its contents. Pumping effectiveness is thereby reduced, but in some applications this is acceptable for the sake of other characteristics.

Figure 17:
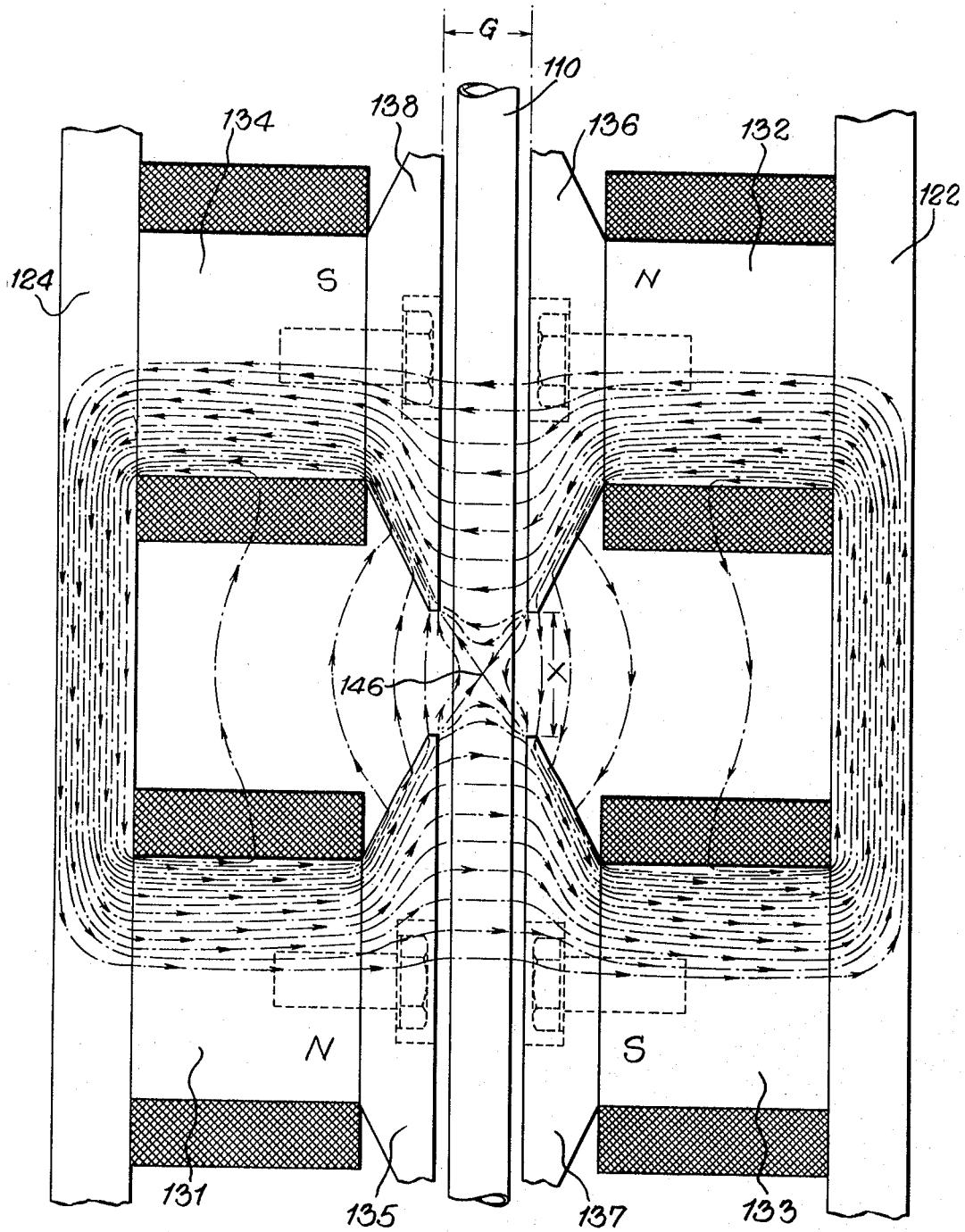
FIGURE 17 is an enlarged, partial plan view of two magnet pole pairs of the electrodynamic pump of FIGURE 14, showing the paths of the lines of magnetic flux.

In FIGURE 17 there is shown an enlarged view of electromagnets 131 through 134 to which have been respectively affixed the pole pieces 135 through 138. The arrows in the diagram show the flow of the magnetic lines of flux from the north poles to the south poles through the back plates 122 and 124 and across the air gap and the fluid conduit 110. The gap width is designated by the letter G and the spacing between adjacent pole pieces is designated by the letter X. It is seen that there is only one point 146 in the liquid conduit at which the flux density is zero. Each pole piece is flared outwardly from the magnet to which it is affixed so that it follows the arc of the tubular conduit and tapers to a relatively narrow edge at the portion facing the adjacent pole piece. This unique shape serves to direct the flux path as illustrated in FIGURE 17.

The pole piece shapes serve to achieve two basic objectives:

(1) The entire length of fluid conduit in the arc of the magnetic poles is penetrated by magnetic flux, the polarity of which reverses from one pole to the next adjacent pole.

(2) The configuration and separation of adjacent pole pieces is such as to minimize flux leakage between them while creating the desired flux density through the fluid conduit.

In FIGURE 18 there is illustrated a plot of average flux density 147 in the air gap area along its center line. 148, 149 and 150 represent magnet poles positioned along the air gap. Adjacent pole pieces are of opposite polarity. It is seen that the flux density is maximum and approximately uniform in front of each pole piece and within the planes of its edges 152 and is zero at the midplane 154. In the region between the pole pieces there is a rapid change of direction of the flux with the result that the flux density is zero only at the midplane 154. Consequently, there is no measurable region of the fluid conduit where the flux density is substantially zero or at which the pumping effect is zero.

Throughout the arc swept by the magnet poles the pumping is positive (in the same direction). This is seen from the plot of the eddy currents and magnetic flux illustrated in FIGURE 19. The eddy current group 156 is composed of current filaments having the direction of the arrows. The magnetic flux is shown as going into the drawing with a plus sign and out of the drawing with a dot. The eddy current return paths are through the electrical conductors 116 and 118. It can be seen that the eddy current filaments flow downward across the conduit 110 wherever the magnetic flux is directed into the drawing and they flow upward across the fluid conduit wherever the magnetic flux is directed out from the drawing. It can therefore be seen that the pumping of the liquid is always in the same direction.

In FIGURES 18 and 19 the counter-magnetizing effects of the eddy currents were neglected. This condition will never exist in actual pumps so that it is necessary to consider the effect on the pumping which will result from this magnetizing effect. FIGURE 20 shows a plot 147 of the average magnetic flux density along the center line of the air gap without any eddy current counter-magnetizing effect, against position along the center line of the air gap. 151, 148 and 149 represent magnet poles positioned along the air gap. The counter-magnetizing effect of the eddy currents is plotted on curve 158 and the resultant flux density curve is designated as 160. Curve 160 is the algebraic sum of the curves 147 and 158. There are two effects produced when the eddy current counter-magnetization effect is considered: first, the shape of the flux wave is distorted; and second, the position of zero flux density is moved from the midplane by a small amount indicated as 162 on the figure.

This change of wave shape occurs because on one half of the pole piece the eddy current counter-magnetization bucks the main magnetic flux and on the other half of the pole piece the eddy current counter-magnetization reinforces the main magnetic flux. Since the saturation effect in the pole pieces may normally be neglected because it is slight, it is seen from the figure that these opposing effects will tend to cancel each other so far as pumping is concerned. The plane of zero flux density is moved slightly but this has no significant effect on the pumping efficiency.

The pump of the instant invention has three advantages over the prior art electrodynamic pumps:

(1) Larger expanse of fluid conduit penetrated by high flux density.

(2) Larger eddy currents because the path is shorter and wider and consequently has a lower resistance.

(3) More effective interaction between the eddy currents and the magnetic flux and more effective pumping because of the elimination of the flux-free areas.

The speed of the electrodynamic pump of the instant invention and of the prior art electrodynamic pumps can easily be changed by changing the diameter of the drive pulley 130 (FIGURE 14) which is affixed to the magnet assembly drive shaft.

Electrodynamic pumps of the instant invention may be used in environments in which there is not sufficient cooling from the atmosphere in which the pump is placed. These pumps might be required to operate in vacuo or in a rarefied atmosphere present in nuclear power generating systems on vehicles or planetary bodies outside the earth's atmosphere or in rarefied strata of the earth's atmosphere. Moreover, systems are now contemplated in which the liquid metal temperature is above the Curie point of the material of the magnets and their pole pieces. When the magnets reach the Curie point of the material of which they are made, they lose their magnetic properties and the pump efficiency is sharply diminished.

Figure 21:
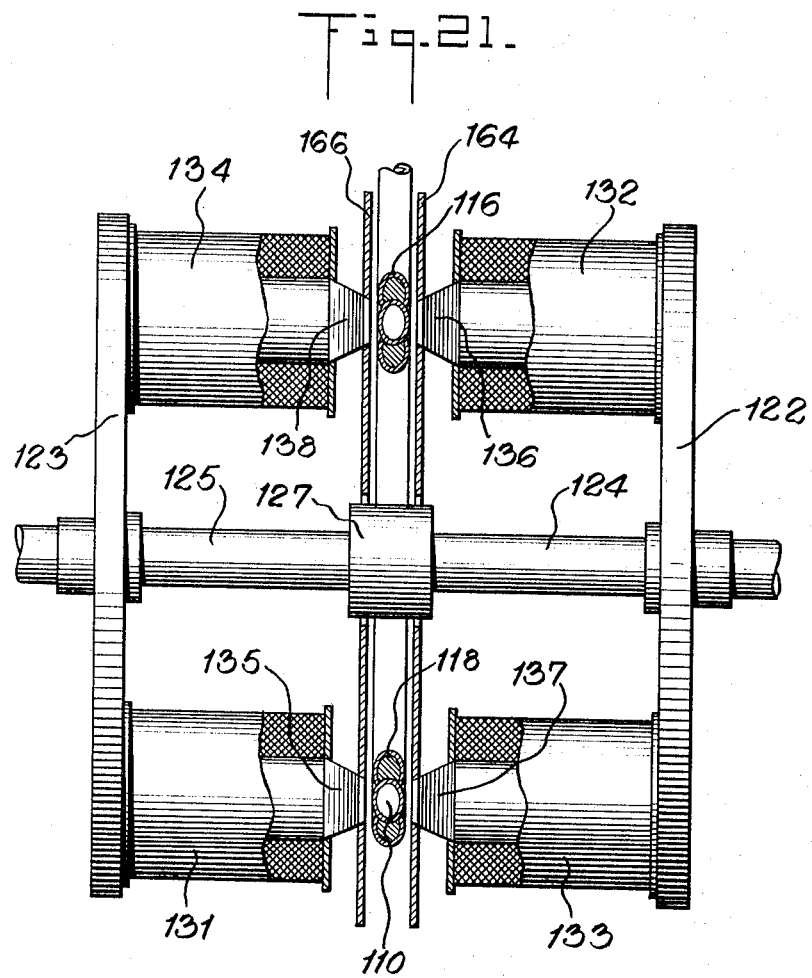
FIGURE 21 is a view similar to that of FIGURE 14 showing an alternative embodiment of the electrodynamic pump of the invention with special features for use in rarified atmospheres.

The source of the heat in the pump is the fluid conduit and the electrical conductor rings and the heat transfer toward the magnets in vacuo is by Stefan-Boltzman radiation. To overcome the effect of this radiation and to continue to obtain maximum pumping efficiency by keeping the temperature of the magnets and the pole pieces below the Curie points of the material of which they are made, the system illustrated in FIGURE 21 is employed. This system is required whether the magnets are of the permanent type or are electromagnets.

Heat shields 164 and 166 are respectively mounted so as to rotate with the rotating magnet assembly (details not shown). They are preferably formed of stainless steel or Inconel and serve to inhibit the transfer of heat from the fluid conduit to the magnets. Openings are provided in the heat shields to permit the faces of the pole pieces 135, 136, 137 and 138 facing the fluid conduit 110 to be located as close as possible to the fluid conduit. Where this spacing is not critical, the heat shield may be made without openings and can be mounted directly to the pump housing or frame in a fixed position if desired. The surface of the heat shield facing the fluid condit should be coplanar with or parallel to the faces of the pole pieces. It is best to treat the surfaces of the various pump elements to inhibit heat radiation toward the magnets but to permit heat radiation from the magnets to allow them to run as cool as possible.

To accomplish this, the faces of the pole pieces facing the conduit are gold-plated to reduce their absorptivity to a low level. All the other surfaces of the pole pieces and of the magnet bodies exposed to the pump housing are suitably darkened by oxidation or coating to achieve radiation emissivity coefficients of at least 0.5. The surfaces of the heat shields facing toward the pump housing are also darkened and the surfaces of the heat shields facing the conduit are gold-plated. Under less severe conditions of heat radiation it may not be necessary to gold plate the heat shield surfaces. It may be sufficient in these circumstances to highly polish those surfaces which have previously been indicated to be gold-plated. Similarly, it is not always necessary to darken all the other surfaces. Operating temperatures will dictate the course of action to be followed.

The operation of the pumps illustrated in FIGURES 14 and 21 proceeds as follows: the shafts 124 and 125 are rotated by means of an external motor (not shown) which is coupled to pulley 130. The magnet assembly, which is mounted on the shafts, is caused to rotate thereby moving the magnetic flux fields and their associated eddy current groups around the tubular liquid conduit 110. The interaction of the magnetic field and the eddy currents causes the liquid metal to be propelled along conduit 110 from entrance position 112 and to be ejected from conduit 110 through exit position 114.

While particular embodiments of the invention have been shown and described, it is apparent to those skilled in the art that modifications are possible without departing from the spirit of the invention or the scope of the subjoined claims.

What is claimed is:

1. Apparatus for pumping electrically conductive fluid comprising:
   an electrically conductive, arcuate, tubular conduit for conducting the electrically conductive fluid from an entrance position to an exit position;
   magnet pole means including an even number of spaced magnet pole pairs placed such that the electrically conductive, arcuate, tubular conduit is between the magnet pole pairs and the magnetic flux fields are directed therethrough;
   the directions of the fields produced by adjacent magnet pole pairs being opposite in direction;
   the magnet pole pairs being spaced and shaped so that the edge of one magnet pole is separated from the edge of the next adjacent magnet pole by a distance not less than the width of the final air gap in each magnet pole pair and not more than four times this width and such that there is a rapid change of direction of the magnetic flux field in the electrically conductive, arcuate, tubular conduit between adjacent magnet pole pairs and there is substantially no field-free region traversed by the electrically conductive fluid;
   means operatively connected to the magnet pole means for mechanically moving the magnet pole means lengthwise along the electrically conductive, arcuate, tubular conduit thereby creating electrical eddy currents in the electrically conductive fluid which interact with the magnetic flux fields so as to produce additive propulsive forces on the electrically conductive fluid from the entrance position to the exit position.

2. Apparatus for pumping electrically conductive fluid comprising:
   an electrically conductive, arcuate, tubular conduit for conducting the electrically conductive fluid from an entrance position to an exit position;
   electrical conductor means extending lengthwise along oppositely-disposed sides of the electrically conductive, arcuate, tubular conduit so as to make electrical conncetion therewith and therethrough with the electrically conductive fluid between the entrance position and the exit position;
   magnet pole means including an even number of spaced magnet pole pairs placed such that the electrically conductive, arcuate, tubular conduit is between the magnet pole pairs and the magnetic flux fields are directed therethrough between the oppositely-disposed sides to which the electrical conductor means are connected;
   the directions of the fields produced by adjacent magnet pole pairs being opposite in direction;
   the magnet pole pairs being spaced and shaped so that the edge of one magnet pole is separated from the edge of the next adjacent magnet pole by a distance not less than the width of the final air gap in each magnet pole pair and not more than four times this width and such that there is a rapid change of direction of the magnetic flux field in the electrically conductive, arcuate, tubular conduit between adjacent magnet pole pairs and there is substantially no field-free region traversed by the electrically conductive fluid;
   means operatively connected to the magnet pole means for mechanically moving the magnet pole means lengthwise along the electrically conductive, arcuate, tubular conduit thereby creating electrical eddy currents in the electrically conductive fluid which interact with the magnetic flux fields so as to produce additive propulsive forces on the electrically conductive fluid from the entrance position to the exit position.

3. Apparatus for pumping electrically conductive fluid comprising:
   an arcuate, tubular conduit for conducting the electrically conductive fluid from an entrance position to an exit position;
   magnet pole means including an even number of spaced magnet pole pairs placed such that the arcuate, tubular conduit is between the magnet pole pairs and the magnetic flux fields are directed therethrough;
   the directions of the fields produced by adjacent magnet pole pairs being opposite in direction;
   the magnet pole pairs being spaced and shaped so that the edge of one magnet pole is separated from the edge of the next adjacent magnet pole by a distance not less than the width of the final air gap in each magnet pole pair end not more than four times this width and such that there is a rapid change of direction of the magnetic flux field in the arcuate, tubular conduit between adjacent magnet pole pairs and there is substantially no field-free region traversed by the electrically conductive fluid;
   means operatively connected to the magnet pole means for mechanically moving the magnet pole means lengthwise along the arcuate, tubular conduit thereby creating electrical eddy currents in the electrically conductive fluid which interact with the magnetic flux fields so as to produce additive propulsive forces on the electrically conductive fluid from the entrance position to the exit position.

4. Apparatus for pumping electrically conductive fluid comprising:
   an arcuate, tubular conduit for conducting the electrically conductive fluid from an entrance position to an exit position;
   electrical conductor means extending lengthwise along oppositely-disposed sides of the arcuate, tubular conduit so as to make electrical connection therewith and therethrough with the electrically conductive fluid between the entrance position and the exit position;
   magnet pole means including an even number of spaced magnet pole pairs placed such that the arcuate, tubular conduit is between the magnet pole pairs and the magnetic flux fields are directed therethrough between the oppositely-disposed sides to which the electrical conductor means are connected;
   the directions of the fields produced by adjacent magnet pole pairs being opposite in direction;
   the magnet pole pairs being spaced and shaped so that the edge of one magnet pole is separated from the edge of the next adjacent magnet pole by a distance not less than the width of the final air gap in each magnet pole pair and not more than four times this width and such that there is a rapid change of direction of the magnetic flux field in the arcuate, tubular conduit between adjacent magnet pole pairs and there is substantially no field-free region traversed by the electrically conductive fluid;
   means operatively connected to the magnet pole means for mechanically moving the magnet pole means lengthwise along the arcuate, tubular conduit thereby creating electrical eddy currents in the electrically conductive fluid which interact with the magnetic flux fields so as to produce additive propulsive forces on the electrically conductive fluid from the entrance position to the exit position.

5. Apparatus for pumping electrically conductive fluid comprising:
   an electrically conductive, arcuate, tubular conduit for conducting the electrically conductive fluid from an entrance position to an exit position;
   electrical conductor means extending lengthwise along oppositely-disposed sides of the electrically conductive, arcuate, tubular conduit so as to make electrical connection therewith and therethrough with the electrically conductive fluid between the entrance position and the exit position;
   magnet pole means including at least two pairs of spaced magnet poles producing at least two discrete magnetic flux fields therebetween, the direction of the field produced by the first pair of magnet poles being opposite to that produced by the second pair of magnet poles;
   the magnet pole means being spaced and shaped so that the edge of one magnet pole is separated from the edge of the next adjacent magnet pole by a distance not less than the width of the final air gap in each magnet pole pair and not more than four times this width and such that there is substantially no field-free region traversed by the electrically conductive fluid;
   means mounting the magnet pole means to direct the magnetic flux fields through the electrically conductive fluid between the oppositely-disposed sides of the electrically conductive, arcuate, tubular conduit to which the electrical conductor means are connected; and
   means operatively connected to the means mounting the magnet pole means for mechanically moving the magnet pole means lengthwise along the electrically conductive, arcuate, tubular conduit thereby creating electrical eddy currents in the electrically conductive fluid which interact with the magnetic flux fields so as to produce additive propulsive forces on the electrically conductive fluid in one direction from the entrance position to the exit position.

6. Apparatus for pumping electrically conductive fluid comprising:
   an electrically conductive, arcuate, tubular conduit for conducting the electrically conductive fluid from an entrance position to an exit position;
   electrical conductor means extending lengthwise along first oppositely-disposed sides of the electrically conductive, arcuate, tubular conduit so as to make electrical connection therewith and therethrough with the electrically conductive fluid between the entrance position and the exit position;
   an even plurality of pairs of magnet poles disposed along each of two second oppositely-disposed sides of the electrically conductive, arcuate, tubular conduit normal to the first oppositely-disposed sides with adjacent magnet poles on each of the second oppositely-disposed sides being of opposite polarity;
   means mounting the even plurality of pairs of magnet poles to direct the magnetic flux fields through the electrically conductive fluid between the electrical conductor means;
   the magnet poles on each of the second oppositely-disposed sides being spaced and shaped such that the edge of one magnet pole is separated from the edge of the next adjacent magnet pole by a distance not less than the width of the final air gap in each magnet pole pair and not more than four times this width and such that there is substantially no field-free region traversed by the electrically conductive fluid and there is a rapid change of direction of the magnetic flux field in the electrically conductive, arcuate, tubular conduit between adjacent pairs of magnet poles;
   means operatively connected to the means mounting the even plurality of pairs of magnet poles for mechanically moving the magnet poles lengthwise along the electrically conductive, arcuate, tubular conduit thereby creating electrical eddy currents in the electrically conductive fluid which interact with the magnetic flux fields of the even plurality of pairs of magnet poles so as to produce additive propulsive forces on the electrically conductive fluid in one direction from the entrance position to the exit position.

7. Apparatus for pumping electrically conductive fluid comprising:
   an electrically conductive, arcuate, tubular conduit for conducting the electrically conductive fluid from an entrance position to an exit position;
   electrical conductor means extending lengthwise along oppositely-disposed sides of the electrically conductive, arcuate, tubular conduit so as to make electrical connection therewith and therethrough with the electrically conductive fluid between the entrance position and the exit position;
   magnet pole means including at least two pairs of spaced magnet poles producing at least two discrete magnetic flux fields therebetween, the direction of the fields produced by the fair pair of magnet poles being opposite to that produced by the second pair of magnet poles;
   the magnet pole means being spaced and shaped so that there is substantial no field-free region traversed by the electrically conductive fluid and there is a rapid change of direction of the magnetic flux field in the electrically conductive, arcuate, tubular conduit between adjacent pairs of magnet poles;
   a pole piece of high magnetic permeability affixed to the end face of each magnet pole;
   the pole piece being flared outwardly from the magnet pole toward the electrically conductive, arcuate, tubular conduit and toward the similar edges of the pole pieces on the next adjacent magnet poles on the same side of the electrically conductive, arcuate, tubular conduit and along the arc thereof and spaced therefrom;
   each terminated edge of the pole piece being separated from the terminated edge of the next adjacent pole piece by a distance not less than the width of the final air gap in each magnet pole pair and not more than four times this width to achieve minimum leakage of flux between the adjacent pole pieces and maintenance of effective flux densities throughout the arcuate path of the electrically conductive, arcuate, tubular conduit;
   means mounting the magnet pole means to direct the magnetic flux fields through the electrically conductive fluid between the oppositely-disposed sides of the electrically conductive, arcuate, tubular conduit to which the electrical conductor means are connected;
   means operatively connected to the means mounting the magnet pole means for mechanically moving the magnet pole means lengthwise along the electrically conductive, arcuate, tubular conduit thereby creating electrical eddy currents in the electrically conductive fluid which interact with the magnetic flux fields so as to produce additive propulsive forces on the electrically conductive fluid in one direction from the entrance position to the exit position.

8. Apparatus for pumping electrically conductive fluid comprising:
   an arcuate, tubular conduit for conducting the electrically conductive fluid from an entrance position to an exit position;
   electrical conductor means extending lengthwise along oppositely-disposed sides of the arcuate, tubular conduit so as to make electrical connection therewith and therethrough with the electrically conductive fluid between the entrance position and the exit position;
   magnet pole means including at least two pairs of spaced magnet poles producing at least two discrete magnetic flux fields therebetween, the direction of the field produced by the first pair of magnet poles being opposite to that produced by the second pair of magnet poles;
   the magnet pole means being spaced and shaped so that there is substantially no field-free region traversed by the electrically conductive fluid and there is a rapid change of direction of the magnetic flux field in the arcuate, tubular conduit between adjacent pairs of magnet poles;
   a pole piece of high magnetic permeability affixed to the end face of each magnet pole;
   the pole piece being flared outwardly from the magnet pole toward the arcuate, tubular conduit and toward the similar edges of the pole pieces on the next adjacent magnet poles on the same side of the arcuate, tubular conduit and along the arc thereof and spaced therefrom;
   each terminated edge of the pole piece being separated from the terminated edge of the next adjacent pole piece by a distance not less than the width of the final air gap in each magnet pole pair and not more than four times this width to achieve minimum leakage of flux between the adjacent pole pieces and maintenance of effective flux densities throughout the arcuate path of the arcuate, tubular conduit;
   means mounting the magnet pole means to direct the magnetic flux fields through the electrically conductive fluid between the oppositely-disposed sides of the arcuate, tubular conduit to which the electrical conductor means are connected;
   means operatively connected to the means mounting the magnet pole means for mechanically moving the magnet pole means lengthwise along the arcuate, tubular conduit thereby creating electrical eddy currents in the electrically conductive fluid which interact with the magnetic flux fields so as to produce additive propulsive forces on the electrically conductive fluid in one direction from the entrance position to the exit position.

9. Apparatus for pumping electrically conductive fluid comprising:
   an electrically conductive, arcuate, tubular conduit for conducting the electrically conductive fluid from an entrance position to an exit position;
   electrical conductor means extending lengthwise along oppositely-disposed sides of the electrically conductive, arcuate, tubular conduit so as to make electrical connection therewith and therethrough with the electrically conductive fluid between the entrance position and the exit position;
   magnet pole means including at least two pairs of spaced magnet poles producing at least two discrete magnetic flux fields therebetween, the direction of the field produced by the first pair of magnet poles being opposite to that produced by the second pair of magnet poles;
   the magnet pole means being spaced and shaped so that there is substantially no field-free region traversed by the electrically conductive fluid and there is a rapid change of direction of the magnetic flux field in the electrically conductive, arcuate, tubular conduit between adjacent pairs of magnet poles;
   the end of each magnet pole being flared outwardly toward the electrically conductive, arcuate, tubular conduit and toward the similar edges on the next adjacent magnet poles on the same side of the electrically conductive, arcuate, tubular conduit and along the arc thereof and spaced therefrom;
   each terminated edge of the end of the magnet pole being separated from the terminated edge of the next adjacent magnet pole end by a distance not less than the width of the final air gap in each magnet pole pair and not more than four times this width to achieve minimum leakage of flux between the adjacent magnet poles and maintenance of effective flux densities throughout the arcuate path of the electrically conductive, arcuate, tubular conduit;
   means mounting the magnet pole means to direct the magnetic flux fields through the electrically conductive fluid between the oppositely-disposed sides of the electrically conductive, arcuate, tubular conduit to which the electrical conductor means are connected;

means operatively connected to the means mounting the magnet pole means for mechanically moving the magnet pole means lengthwise along the electrically conductive, arcuate, tubular conduit thereby creating electrical eddy currents in the electrically conductive fluid which interact with the magnetic flux fields so as to produce additive propulsive forces on the electrically conductive fluid in one direction from the entrance position to the exit position.

10. Apparatus for pumping electrically conductive fluid comprising:
- an arcuate, tubular conduit for conducting the electrically conductive fluid from an entrance position to an exit position;
- electrical conductor means extending lengthwise along oppositely-disposed sides of the arcuate, tubular conduit so as to make electrical connection therewith and therethrough with the electrically conductive fluid between the entrance position and the exit position;
- magnet pole means including at least two pairs of spaced magnet poles producing at least two discrete magnetic flux fields therebetween, the direction of the field produced by the first pair of magnet poles being opposite to that produced by the second pair of magnet poles;
- the magnet pole means being spaced and shaped so that there is substantially no field-free region traversed by the electrically conductive fluid and there is a rapid change of direction of the magnetic flux field in the arcuate, tubular conduit between adjacent pairs of magnet poles;
- the end of each magnet pole being flared outwardly toward the arcuate, tubular conduit and toward the similar edges on the next adjacent magnet poles on the same side of the arcuate, tubular conduit and along the arc thereof and spaced therefrom;
- each terminated edge of the end of the magnet pole being separated from the terminated edge of the next adjacent magnet pole end by a distance not less than the width of the final air gap in each magnet pole pair and not more than four times this width to achieve minimum leakage of flux between the adjacent magnet poles and maintenance of effective flux densities throughout the arcuate path of the arcuate, tubular conduit;
- means mounting the magnet pole means to direct the magnetic flux fields through the electrically conductive fluid between the oppositely-disposed sides of the arcuate, tubular conduit to which the electrical conductor means are connected;
- means operatively connected to the means mounting the magnet pole means for mechanically moving the magnet pole means lengthwise along the arcuate, tubular conduit thereby creating electrical eddy currents in the electrically conductive fluid which interact with the magnetic flux fields so as to produce additive propulsive forces on the electrically conductive fluid in one direction from the entrance position to the exit position.

11. Apparatus for pumping electrically conductive fluid comprising:
- an electrically conductive, arcuate, tubular conduit for conducting the electrically conductive fluid from an entrance position to an exit position;
- electrical conductor means extending lengthwise along first oppositely-disposed sides of the electrically conductive, arcuate, tubular conduit so as to make electrical connection therewith and therethrough with the electrically conductive fluid between the entrance position and the exit position;
- an even plurality of pairs of magnet poles disposed along each of two second oppositely-disposed sides of the electrically conductive, arcuate, tubular conduit normal to the first oppositely-disposed sides with adjacent magnet poles on each of the second oppositely-disposed sides being of opposite polarity;
- a pole piece of high magnetic permeability affixed to the end face of each magnet pole;
- the pole piece being flared outwardly from the magnet pole toward the electrically conductive arcuate, tubular conduit and toward the similar edges of the pole pieces on the next adjacent magnet poles on the same side of the electrically conductive, arcuate, tubular conduit along the arc thereof and spaced therefrom;
- means mounting the even plurality of pairs of magnet poles to direct the magnetic flux fields through the electrically conductive fluid between the electrical conductor means;
- the terminated edges of the pole pieces being separated from the terminated edges of the next adjacent pole pieces by a distance not less than the width of the final air gap in each pole pair and not more than four times this width to achieve minimum leakage of flux between the pole pieces and maintenance of effective flux densities throughout the arcuate path of the electrically conductive arcuate, tubular conduit;
- means operatively connected to the means mounting the even plurality of pairs of magnet poles for mechanically moving the magnet poles lengthwise along the electrically conductive, arcuate, tubular conduit thereby creating electrical eddy currents in the electrically conductive fluid which interact with the magnetic flux fields of the even plurality of pairs of magnet poles so as to produce additive propulsive forces on the electrically conductive fluid in one direction from the entrance position to the exit position.

12. Apparatus for pumping electrically conductive fluid comprising:
- an electrically conductive, arcuate, tubular conduit for conducting the electrically conductive fluid from an entrance position to an exit position;
- electrical conductor means extending lengthwise along first oppositely-disposed sides of the electrically conductive, arcuate, tubular conduit so as to make electrical connection therewith and therethrough with the electrically conductive fluid between the entrance position and the exit position;
- an even plurality of pairs of magnet poles disposed along each of two second oppositely-disposed sides of the electrically conductive, arcuate, tubular conduit normal to the first oppositely-disposed sides with adjacent magnet poles on each of the second oppositely-disposed sides being of opposite polarity;
- the end of each magnet pole being flared outwardly toward the electrically conductive, arcuate, tubular conduit and toward the similar edges on the next adjacent magnet poles on the same side of the electrically conductive, arcuate, tubular conduit and along the arc thereof and spaced therefrom;
- each terminated edge of the end of the magnet pole being separated from the terminated edge of the next adjacent magnet pole end by a distance not less than the width of the final air gap in each magnet pole pair and not more than four times this width to achieve minimum leakage of flux between the adjacent magnet poles and maintenance of effective flux densities throughout the arcuate path of the electrically conductive, arcuate, tubular conduit;
- means operatively connected to the means mounting the even plurality of pairs of magnet poles for mechanically moving the magnet poles lengthwise along the electrically conductive, arcuate, tubular conduit thereby creating electrical eddy currents in the electrically conductive fluid which interact with the magnetic flux fields of the even plurality of pairs of magnet poles so as to produce additive propulsive forces on the electrically conductive fluid in one direction from the entrance position to the exit position.

13. Apparatus for pumping electrically conductive fluid comprising:

an arcuate, tubular conduit for conducting the electrically conductive fluid from an entrance position to an exit position;

electrical conductor means extending lengthwise along first oppositely-disposed sides of the arcuate, tubular conduit so as to make electrical connection therewith and therethrough with the electrically conductive fluid between the entrance position and the exit position;

an even plurality of pairs of magnet poles disposed along each of two second oppositely-disposed sides of the arcuate, tubular conduit normal to the first oppositely-disposed sides with adjacent magnet poles on each of the second oppositely-disposed sides being of opposite polarity;

a pole piece of high magnetic permeability affixed to the end face of each magnet pole;

the pole piece being flared outwardly from the magnet pole toward the arcuate, tubular conduit and toward the similar edges of the pole pieces on the next adjacent magnet poles on the same side of the arcuate, tubular conduit along the arc thereof and spaced therefrom;

means mounting the even plurality of pairs of magnet poles to direct the magnetic flux fields through the electrically conductive fluid between the electrical conductor means;

the terminated edges of the pole pieces being separated from the terminated edges of the next adjacent pole pieces by a distance not less than the width of the final air gap in each pole pair and not more than four times this width to achieve minimum leakage of flux between the pole pieces and maintenance of effective flux densities throughout the arcuate path of the arcuate, tubular conduit;

means operatively connected to the means mounting the even plurality of pairs of magnet poles for mechanically moving the magnet poles lengthwise along the arcuate, tubular conduit thereby creating electrical eddy currents in the electrically conductive fluid which interact with the magnetic flux fields of the even plurality of pairs of magnet poles so as to produce additive propulsive forces on the electrically conductive fluid in one direction from the entrance position to the exit position.

14. Apparatus for pumping electrically conductive fluid comprising:

an arcuate, tubular conduit for conducting the electrically conductive fluid from an entrance position to an exit position;

electrical conductor means extending lengthwise along first oppositely-disposed sides of the arcuate, tubular conduit so as to make electrical connection therewith and therethrough with the electrically conductive fluid between the entrance position and the exit position;

an even plurality of pairs of magnet poles disposed along each of two second oppositely-disposed sides of the arcuate, tubular conduit normal to the first oppositely-disposed sides with adjacent magnet poles on each of the second oppositely-disposed sides being of opposite polarity;

the end of each magnet pole being flared outwardly toward the arcuate, tubular conduit and toward the similar edges on the next adjacent magnet poles on the same side of the arcuate, tubular conduit and along the arc thereof and spaced therefrom;

each terminated edge of the end of the magnet pole being separated from the terminated edge of the adjacent magnet pole end by a distance not less than the width of the final air gap in each magnet pole pair and not more than four times this width to achieve minimum leakage of flux between the adjacent magnet poles and maintenance of effective flux densities throughout the arcuate path of the arcuate, tubular conduit;

means operatively connected to the means mounting the even plurality of pairs of magnet poles for mechanically moving the magnet poles lengthwise along the arcuate, tubular conduit thereby creating electrical eddy currents in the electrically conductive fluid which interact with the magnetic flux fields of the even plurality of pairs of magnet poles so as to produce additive propulsive forces on the electrically conductive fluid in one direction from the entrance position to the exit position.

15. In apparatus for pumping electrically conductive fluid in one direction through an arcuate, tubular conduit from an entrance position to an exit position including electrical conductor means extending lengthwise along oppositely-disposed sides of the arcuate, tubular conduit so as to make electrical connection thereto between the entrance position and the exit position and magnet pole means comprising at least two pairs of opposed magnet poles producing magnetic flux fields through the electrically conductive fluid between the oppositely-disposed sides of the arcuate, tubular conduit wherein the direction of the flux field between the first pair of poles is the reverse of that between the second pair of poles, the magnet pole means being movable lengthwise along the arcuate, tubular conduit so that electrical currents are generated in the electrically conductive fluid and circulated through paths of interaction with the magnetic flux fields so as to produce propulsive forces on the electrically conductive fluid, the improvement comprising:

a pole piece of high magnetic permeability affixed to the end face of each magnet pole;

the pole piece being flared outwardly from the magnet pole toward the arcuate, tubular conduit and toward the similar edges of the pole pieces on the next adjacent magnet poles on the same side of the arcuate, tubular conduit and along the arc thereof and spaced therefrom;

each terminated edge of the pole piece being separated from the terminated edge of the next adjacent pole piece by a distance not less than the width of the final air gap in each pole pair and not more than four times this width to achieve minimum leakage of flux between the pole pieces and maintenance of effective flux densities throughout the arcuate path of the arcuate, tubular conduit.

16. In apparatus for pumping electrically conductive fluid in one direction through an arcuate, tubular conduit from an entrance position to an exit position including electrical conductor means extending lengthwise along oppositely-disposed sides of the arcuate, tubular conduit so as to make electrical connection thereto between the entrance position and the exit position and magnet pole means comprising at least two pairs of opposed magnet poles producing magnetic flux fields through the electrically conductive fluid between the oppositely-disposed sides of the arcuate, tubular conduit wherein the direction of the flux field between the first pair of poles is the reverse of that between the second pair of poles, the magnet pole means being movable lengthwise along the arcuate, tubular conduit so that electrical currents are generated in the electrically conductive fluid and circulated through paths of interaction with the magnetic flux fields so as to produce propulsive forces on the electrically conductive fluid, the improvement comprising:

the end of each magnet pole being flared outwardly toward the arcuate, tubular conduit and toward the similar edges on the next adjacent magnet poles on the same side of the arcuate, tubular conduit and along the arc thereof and spaced therefrom;

each terminated edge of the end of the magnet pole being separated from the terminated edge of the next adjacent magnet pole by a distance not less than the width of the final air gap in each magnet pole pair and not more than four times this width to achieve minimum leakage of flux between the adjacent magnet poles and maintenance of effective flux densities throughout the arcuate path of the arcuate, tubular conduit.

17. Apparatus for pumping electrically conductive fluid comprising:
an electrically conductive, arcuate, tubular conduit for conducting the electrically conductive fluid from an entrance position to an exit position;
magnet pole means including an even number of spaced magnet pole pairs placed such that the electrically conductive, arcuate, tubular conduit is between the magnet pole pairs and the magnet flux fields are directed therethrough;
the directions of the fields produced by adjacent magnet pole pairs being opposite in direction;
the magnet pole pairs being spaced and shaped so that there is a rapid change of direction of the magnetic flux field in the electrically conductive, arcuate, tubular conduit between adjacent magnet pole pairs and there is substantially no field-free region traversed by the electrically conductive fluid;
means operatively connected to the magnet pole means for mechanically moving the magnet pole means lengthwise along the electrically conductive, arcuate, tubular conduit thereby creating electrical eddy currents in the electrically conductive fluid which interact with the magnet flux fields so as to produce additive propulsive forces on the electrically conductive fluid from the entrance position to the exit position;
a heat shield mounted between the electrically conductive, arcuate, tubular conduit and the magnet pole means such that the heat radiated from the electrically conductive, arcuate, tubular conduit is inhibited from reaching the bodies of the magnet poles;
the heat shield having openings therein through which the faces of the magnet poles are exposed to the electrically conductive, arcuate, tubular conduit;
the face of the heat shield toward the electrically conductive, arcuate, tubular conduit and the faces of the magnet poles being gold plated;
the opposite face of the heat shield and the exposed surfaces of the magnet poles adjacent thereto being darkened;
the heat shield being moved with the magnet pole means.

18. Apparatus for pumping electrically conductive fluid comprising:
an electrically conductive, arcuate, tubular conduit for conducting the electrically conductive fluid from an entrance position to an exit position;
electrical conductor means extending lengthwise along oppositely-disposed sides of the electrically conductive, arcuate, tubular conduit so as to make electrical connection therewith and therethrough with the electrically conductive fluid between the entrance position and the exit position;
magnet pole means including an even number of spaced magnet pole pairs placed such that the electrically conductive, arcuate, tubular conduit is between the magnet pole pairs and the magnetic flux fields are directed therethrough between the oppositely-disposed sides to which the electrical conductor means are connected;
the directions of the fields produced by adjacent magnet pole pairs being opposite in direction;
the magnet pole pairs being spaced and shaped so that there is a rapid change of direction of the magnetic flux field in the electrically conductive, arcuate, tubular conduit between adjacent magnet pole pairs and there is substantially no field-free region traversed by the electrically conductive fluid;
means operatively connected to the magnet pole means for mechanically moving the magnet pole means lengthwise along the electrically conductive, arcuate, tubular conduit thereby creating electrical eddy currents in the electrically conductive fluid which interact with the magnet fluid fields so as to produce additive propulsive forces on the electrically conductive fluid from the entrance position to the exit position;
a heat shield mounted between the electrically conductive, arcuate, tubular conduit and the magnet pole means such that the heat radiated from the electrically conductive, arcuate, tubular conduit is inhibited from reaching the bodies of the magnet poles;
the heat shield having openings therein through which the faces of the magnet poles are exposed to the electrically conductive, arcuate, tubular conduit;
the face of the heat shield toward the electrically conductive, arcuate, tubular conduit and the faces of the magnet poles being gold plated;
the opposite face of the heat shield and the exposed surfaces of the magnet poles adjacent thereto being darkened;
the heat shield being moved with the magnet pole means.

19. Apparatus for pumping electrically conductive fluid comprising:
an arcuate, tubular conduit for conducting the electrically conductive fluid from an entrance position to an exit position;
magnet pole means including an even number of spaced magnet pole pairs placed such that the arcuate, tubular conduit is between the magnet pole pairs and the magnetic flux fields are directed therethrough;
the directions of the fields produced by adjacent magnet pole pairs being opposite in direction;
the magnet pole pairs being spaced and shaped so that there is a rapid change of direction of the magnetic flux field in the arcuate, tubular conduit between adjacent magnet pole pairs and there is substantially no field-free region traversed by the electrically conductive fluid;
means operatively connected to the magnet pole means for mechanically moving the magnet pole means lengthwise along the arcuate, tubular conduit thereby creating electrical eddy currents in the electrically conductive fluid which interact with the magnetic flux fields so as to produce additive propulsive forces on the electrically conductive fluid from the entrance position to the exit position;
a heat shield mounted between the arcuate, tubular conduit and the magnet pole means such that the heat radiated from the arcuate, tubular conduit is inhibited from reaching the bodies of the magnet poles;
the heat shield having openings therein through which the faces of the magnet poles are exposed to the arcuate, tubular conduit;
the face of the heat shield toward the arcuate, tubular conduit and the faces of the magnet poles being gold plated;
the opposite face of the heat shield and the exposed surfaces of the magnet poles adjacent thereto being darkened;
the heat shield being moved with the magnet pole means.

20. Apparatus for pumping electrically conductive fluid comprising:
an arcuate, tubular conduit for conducting the electrically conductive fluid from an entrance position to an exit position;
electrical conductor means extending lengthwise along oppositely-disposed sides of the arcuate, tubular conduit so as to make electrical connection therewith and therethrough with the electrically conductive fluid between the entrance position and the exit position;

magnet pole means including an even number of spaced magnet pole pairs placed such that the arcuate, tubular conduit is between the magnet pole pairs and the magnetic flux fields are directed therethrough between the oppositely-disposed sides to which the electrical conductor means are connected;

the directions of the fields produced by adjacent magnet pole pairs being opposite in direction;

the magnet pole pairs being spaced and shaped so that there is a rapid change of direction of the magnetic flux field in the arcuate, tubular conduit between adjacent magnet pole pairs and there is substantially no field-free region traversed by the electrically conductive fluid;

means operatively connected to the magnet pole means for mechanically moving the magnet pole means lengthwise along the arcuate, tubular conduit thereby creating electrical eddy currents in the electrically conductive fluid which interact with the magnetic flux fields so as to produce additive propulsive forces on the electrically conductive fluid from the entrance position to the exit position;

a heat shield mounted between the arcuate, tubular conduit and the magnet pole means such that the heat radiated from the arcuate, tubular conduit is inhibited from reaching the bodies of the magnet poles;

the heat shield having openings therein through which the faces of the magnet poles are exposed to the arcuate, tubular conduit;

the face of the heat shield toward the arcuate, tubular conduit and the faces of the magnet poles being gold plated;

the opposite face of the heat shield and the exposed surfaces of the magnet poles adjacent thereto being darkened;

the heat shield being moved with the magnet pole means.

21. In apparatus for pumping electrically conductive fluid in one direction through an arcuate, tubular conduit from an entrance position to an exit position including magnet pole means comprising at least one pair of opposed magnet poles movable lengthwise along the arcuate, tubular conduit producing magnetic flux fields through the electrically conductive fluid so that electrical currents are generated in the electrically conductive fluid and circulated through paths of interaction with the magnetic flux fields so as to produce propulsive forces on the electrically conductive fluid to move the electrically conductive fluid from the entrance position to the exit position, the improvement comprising:

a heat shield mounted so as to move with the magnet pole means located between the arcuate, tubular conduit and the magnet pole means such that the heat radiated from the arcuate, tubular conduit is inhibited from reaching the bodies of the magnet poles;

the heat shield having openings therein through which the faces of the magnet poles are exposed to the arcuate, tubular conduit;

the face of the heat shield toward the arcuate, tubular conduit and the faces of the magnet poles being gold plated;

the opposite face of the heat shield and the exposed surfaces of the magnet poles adjacent thereto being darkened.

References Cited by the Examiner

UNITED STATES PATENTS

| 2,915,973 | 12/1959 | Findlay | 103—1 |
| 2,928,349 | 3/1960 | Findlay | 103—1 |
| 3,038,409 | 6/1962 | Edgerly | 103—1 |
| 3,154,017 | 10/1964 | Edgerly | 103—1 |
| 3,187,672 | 6/1965 | Baker | 103—1 |

LAURENCE V. EFNER, *Primary Examiner.*